United States Patent
Mukai et al.

(10) Patent No.: US 7,525,066 B2
(45) Date of Patent: Apr. 28, 2009

(54) CONSUMABLE ELECTRODE TYPE WELDING METHOD

(75) Inventors: Yasushi Mukai, Osaka (JP); Atsuhiro Kawamoto, Kawanishi (JP); Tatsuya Ikeda, Kawanishi (JP); Hiroyuki Nakata, Osaka (JP); Masaru Kowa, Suita (JP)

(73) Assignee: Panasonic Corporation, Osaka (JP)

( * ) Notice: Subject to any disclaimer, the term of this patent is extended or adjusted under 35 U.S.C. 154(b) by 448 days.

(21) Appl. No.: 10/568,552

(22) PCT Filed: Jun. 27, 2005

(86) PCT No.: PCT/JP2005/011767

§ 371 (c)(1),
(2), (4) Date: Feb. 17, 2006

(87) PCT Pub. No.: WO2006/006383

PCT Pub. Date: Jan. 19, 2006

(65) Prior Publication Data

US 2008/0169276 A1    Jul. 17, 2008

(30) Foreign Application Priority Data

Jul. 8, 2004    (JP)    ............................... 2004-201526

(51) Int. Cl.
*B23K 9/06*    (2006.01)
*B23K 9/28*    (2006.01)

(52) U.S. Cl. ............................... 219/124.01; 219/137.2
(58) Field of Classification Search ... 219/130.1–145.1, 219/124.01–124.03, 124.4, 124.5
See application file for complete search history.

(56) References Cited

U.S. PATENT DOCUMENTS 6,555,786 B2 *    4/2003    Sasano ................... 219/137.71
6,627,850 B1 *    9/2003    Koga et al. ............. 219/137.71

FOREIGN PATENT DOCUMENTS

CN    1385272    12/2002
JP    2002-205169    7/2002

OTHER PUBLICATIONS

Chinese Office action with English translation.

* cited by examiner

*Primary Examiner*—Sang Y Paik
(74) *Attorney, Agent, or Firm*—Pearne & Gordon LLP

(57) ABSTRACT

In a consumable electrode type welding method, while feeding a welding wire 1, a welding torch 4 is moved by a robot manipulator 9 in a direction where the welding torch 4 is pulled apart from a base metal 7, so that an initial arc is generated while the welding wire 1 is separated from the base metal 7. This not only can eliminate the need for the reversing operation of the robot manipulator 9 and thus can reduce the waste time to thereby be able to reduce a tact time but also can stabilize an arc in the welding start portion and thus can reduce the "unexpected stop" effectively.

8 Claims, 7 Drawing Sheets

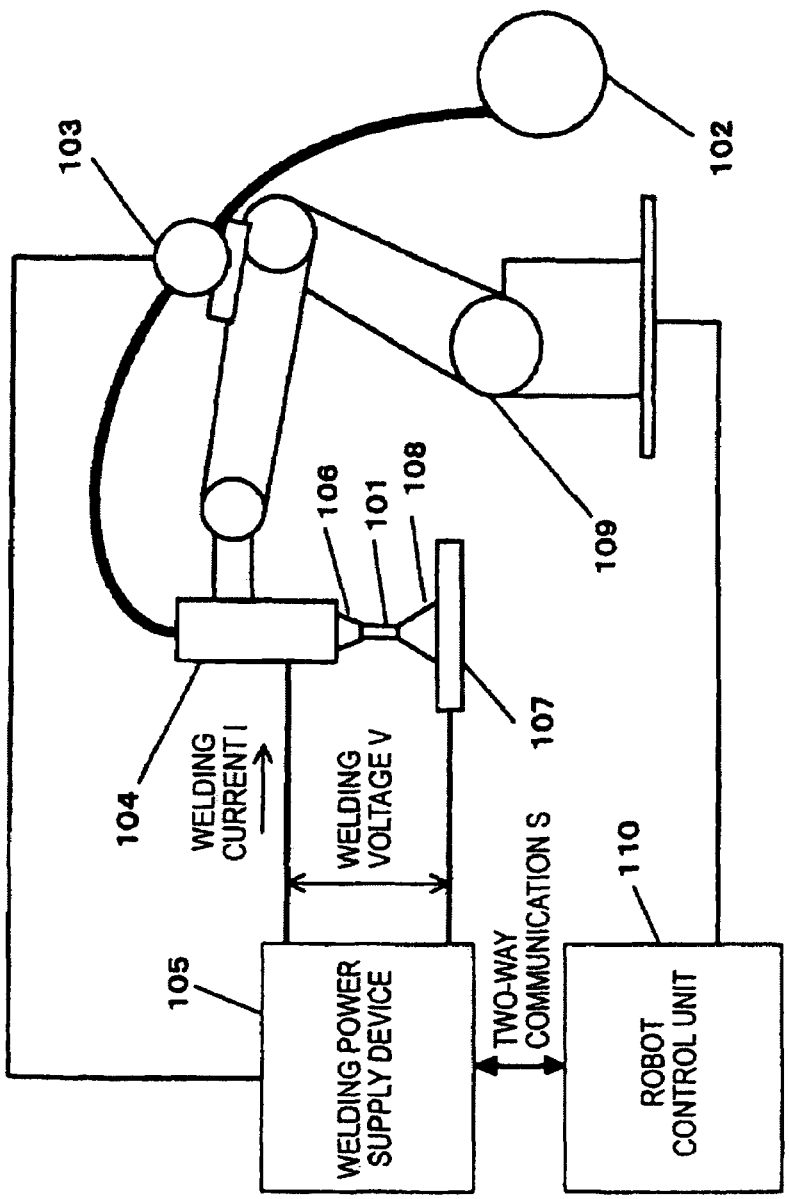

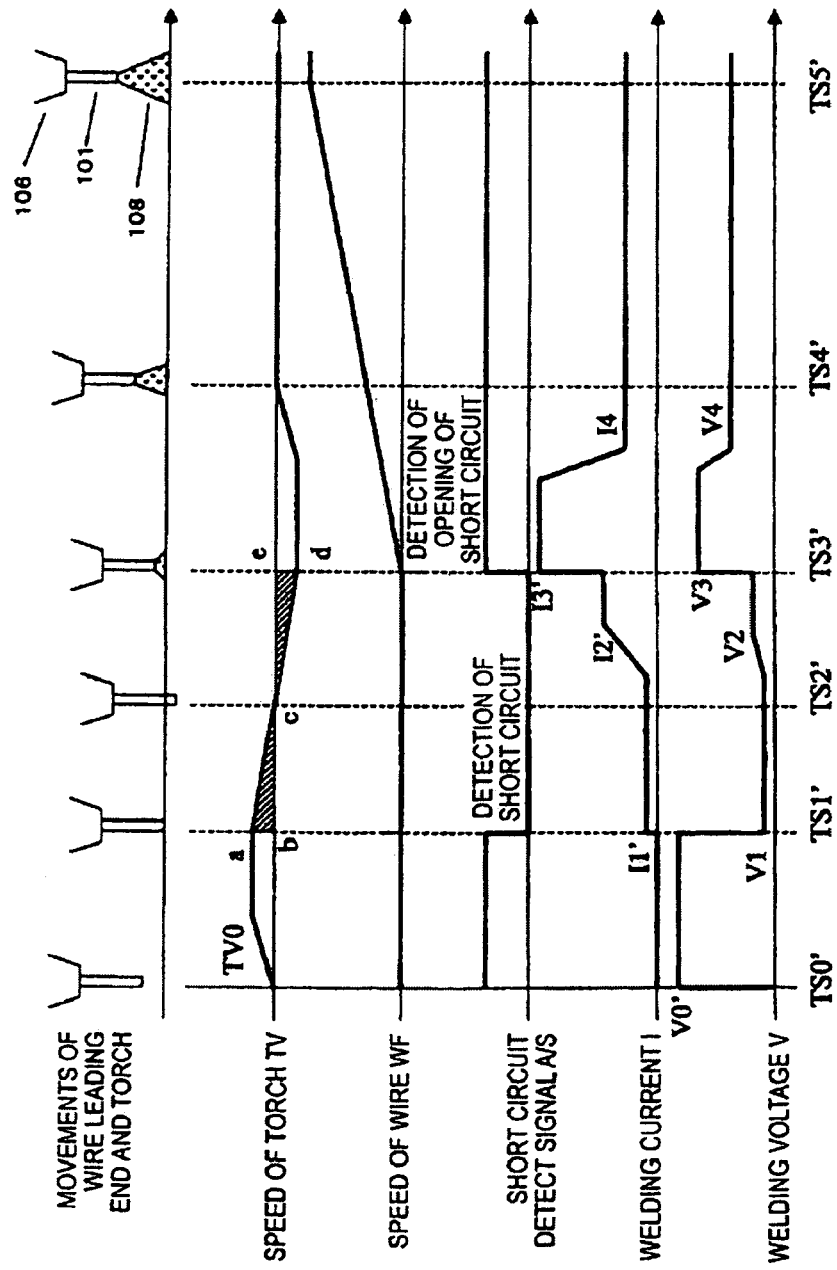

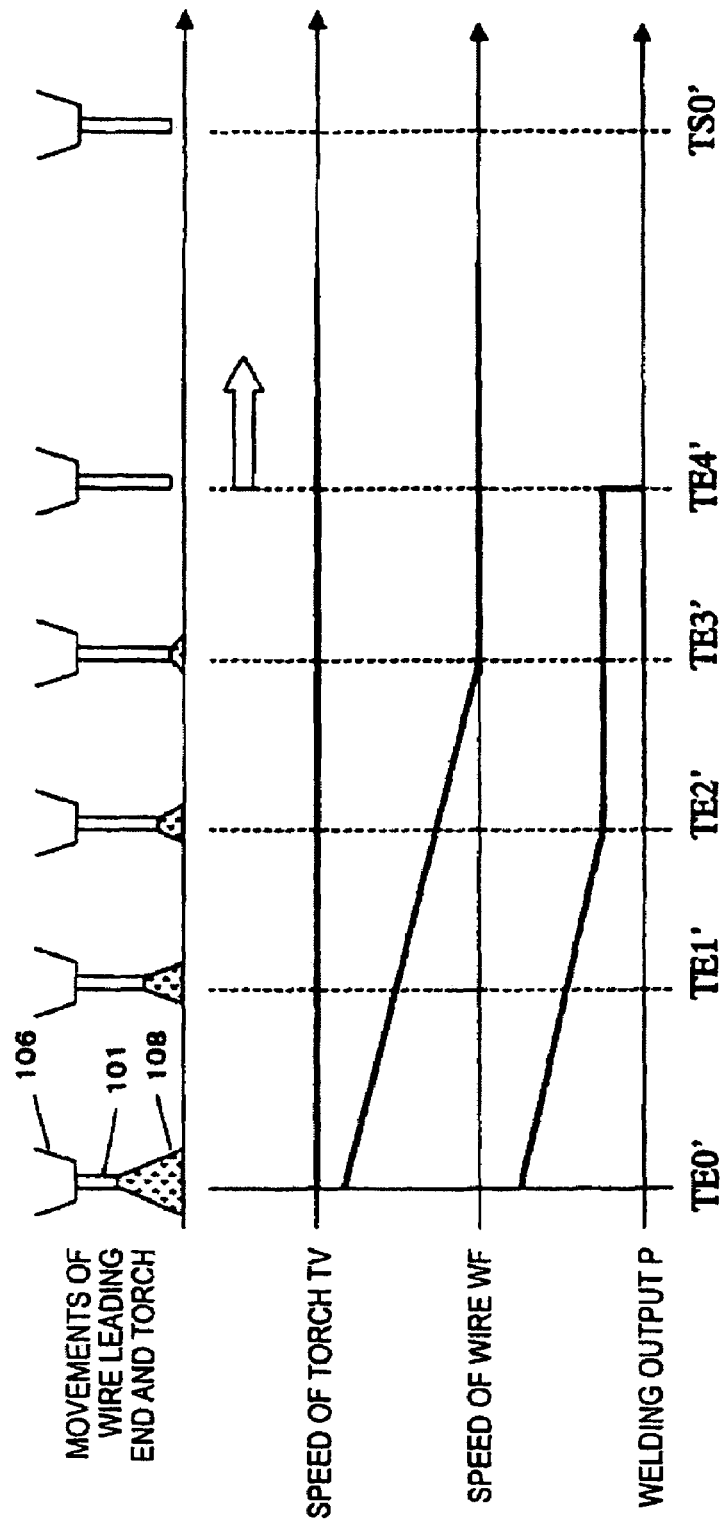

CONSUMABLE ELECTRODE TYPE WELDING METHOD

TITLE OF THE INVENTION

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

Field of the Invention

The present invention relates to a consumable electrode type welding method for generating an arc between a welding wire serving as a consumable electrode and a welding base metal serving as a member to be welded to thereby control the welding output.

Description of Related Art including information disclosed under 37 C.F.R. 1.97 and 1.98.

Recently, the welding industry has always made effort to further enhance the productivity of the welding operation in order to secure an international competitive ability.

Especially, there have been increasing the need for a reduction in a so called "unexpected stop", which is a slight trouble causing the production line to stop, and the need for a reduction in the tact time more than before.

As the reasons for the unexpected stop, there can be pointed out various reasons and the greatest reason is a trouble caused by fault in an arc start.

In view of this, in a conventional consumable electrode type welding method, as a method for enforcing its arc start, there is known the following method: that is, when a start signal is input from the outside, a robot manipulator is moved to thereby move a welding torch to a previously instructed welding start position and after then, while the feeding of the welding wire remains stopped, the welding torch is moved substantially in the welding wire feed direction by the robot manipulator to thereby allow the leading end of the welding wire to approach the member to be welded; if it is detected that the welding wire leading end has come into contact with the member to be welded, an initial current of a preset small current value is applied from a welding power supply device and, at the same time, the welding torch is moved in the opposite direction to the substantially welding wire feed direction to thereby carry out the retreating movement of the welding torch which moves the welding wire leading end away from the member to be welded; if the welding wire leading end and the member to be welded are moved away from each other due to the retreating movement of the welding torch, there is generated an arc to which the initial current is applied and, while the initial arc generating state remains held, the retreating movement of the welding torch is allowed to continue; if the welding torch returns back to the welding start position, the retreating movement is switched over to the movement in the previously instructed welding direction and, at the same time, the feed of the welding wire is started and a steady-state welding current is applied, whereby the initial arc generating state is switched over to the steady-state arc generating stage. (For example, see the patent literature 1).

Now, FIG. 5 is a schematic block diagram of the whole of a welding system for enforcing the above-mentioned consumable electrode type welding method using a robot.

In FIG. 5, reference character 101 designates a welding wire used as a consumable electrode; and, the welding wire 101 can be played out from a wire spool 102 in the direction of a welding torch 104 by a wire feed motor 103. Reference numeral 105 stands for a welding power supply device. The welding power supply device 105 applies a given welding current I and a given welding voltage V, through the welding torch 104 and welding tip 106, into between the welding wire 101 and a base metal 107 serving as a member to be welded to thereby generate an arc 108 and control the wire feed motor 103 for enforcing the welding operation.

Reference numeral 109 designates a robot manipulator. The robot manipulator 109 holds the welding torch 104, positions the torch 104 at a welding start position (not shown) and moves the welding torch 104 along a welding line (not shown).

Also, the robot manipulator 109 is controlled by a robot control unit 110. The robot control unit 110 executes a two-way communication S between the welding power supply device 105 and itself and thus the robot control unit 110 sends welding conditions such as the welding current I and welding voltage V as well as instruction signals such as a welding start signal and a welding end signal.

Now, description will be given below of a consumable electrode type welding method used in the above-structured system with reference to a timing chart shown in FIG. 6.

Referring to FIG. 6 specifically, in the vertical direction thereof, there are shown the respective states of the moving speed of the welding torch TV, the feeding speed of the welding wire WF, a short circuit detect signal A/S, a welding current I and a welding voltage V, whereas the horizontal axis thereof expresses time. In this illustration, as timings, TS0' designates a timing when a welding start signal is transmitted from the robot control unit 110 to the welding power supply device 105, while TS1'-TS5 40 following TS0' stand for timings in the course of time respectively.

Firstly, the robot control unit 110 not only transmits a welding start signal to the welding power supply device 105 but also actuates the robot manipulator 109 to accelerate the welding torch 104 toward the base metal 107. And, when the speed of the welding torch 104 reaches an initial torch speed TV0, the robot control unit 110 causes the acceleration of the robot manipulator 109 to stop and continues the lowering motion of the welding torch 104 at a constant speed.

Also, when receiving the welding start signal from the robot control unit 110, the welding power supply device 105 applies a no-load voltage VO' into between the welding wire 101 and base metal 107.

Then, at the timing TS1', if the welding wire 101 is contacted with the base metal 107, short circuit detect means (not shown) provided in the inside of the welding power supply device 105 outputs a short circuit detect signal A/S.

This short circuit detect signal A/S is transmitted through the two-way communication S to the robot control unit 110 and thus the robot control unit 110 reduces and stops the robot manipulator 109 immediately, so that, at the timing TS2', the operation of the robot manipulator 109 is caused to stop, that is, the speed of the welding torch 104 becomes zero.

After then, the robot control unit 110 immediately reverses the operation of the robot manipulator 109 and starts the operation thereof in a direction where the welding torch 104 is pulled apart from the base metal 107, thereby lifting the welding torch 104.

The period extending from the timing TS1' to TS3' is a short circuit period and, in this period, during the time until the timing TS2' where the robot manipulator 109 reduces down to zero, the welding wire 101 is pressed against the base metal 107; but, from the timing TS2' on, since the operation of the robot manipulator 109 is reversed, the pressing amount of the welding wire 101 decreases and thus, at the timing TS3', the short circuit is removed.

The timing, that is, the timing TS3' occurs at the time when the area of a triangle cde, which is shown by the line of the speed TV of the welding torch and expresses the lifting amount of the welding wire 101, exceeds the area of a triangle abc which is shown by the line of the speed TV of the welding torch for expressing the pressing amount of the welding wire 101.

Here, when the initial short circuit occurs at the timing TS1', the welding power supply device 105 controls the welding current I at I1', and then increases the current up to I2' after passage of a given time and waits for the opening of the short circuit.

As the first stage of the initial short circuit period, the welding current is controlled to I1' which is set relatively low. The reason for this is to avoid a possibility that, owing to the initial short circuit, the leading end portion of the welding wire is heated due to Joule effect to melt the wire and thus, simultaneously with generation of the arc, the molten welding wire can spatter around to form spatters.

Also, to change the current from I1' to I2' is to be able to apply energy enough to generate the arc when the short circuit is opened at the timing TS3.

When an arc is generated at the timing TS3, the welding power supply device 105 actuates the wire feed motor 103 to accelerate the welding wire 101 toward the base metal 107, continues the acceleration until the speed of the welding wire 101 reaches a welding wire speed (not shown) for actual welding, and, after the welding wire speed reaches the welding wire speed for actual welding, continues the feeding of the welding wire at a constant speed.

Also, after controlling the arc current I to an arc initial current I3' for a given time in linking with the actuation of the wire feed motor 103, the welding power supply device 105 controls the current to a second initial current I4 and, after then, controls the current to an output for actual welding (not shown).

Next, description will be given below of a welding end time in the above-mentioned consumable electrode type welding method in the welding system with reference to a timing chart shown in FIG. 7.

Referring to FIG. 6 specifically, in the vertical direction thereof, there are shown the respective states of the moving speed of the welding torch TV, the feeding speed of the welding wire WF and a welding output P, whereas the horizontal axis thereof expresses time. In this illustration, as timings, TE0' designates a timing when a welding end signal is transmitted from the robot control unit 110 to the welding power supply device 105, while TE1'-TE4' following TE0' stand for timings in the course of time respectively.

Firstly, when receiving a welding end signal from the robot control unit 110, the welding power supply device 105 controls the wire feed motor 103 to reduce the feed speed of the welding wire 101.

Simultaneously with this feed speed reduction of the welding wire, the welding power supply device 105 reduces the welding output and, at a timing TE2' where a predetermined condition is satisfied, it controls the welding output to a constant welding output.

This constant output PI is referred to as a "burn-back". Generally, the welding power supply device 105 continues the burn-back at and from a timing TE3' where the welding wire 101 is caused to stop, that is, keeps the constant output to continue the ark 108 for a given period; and, after the welding wire 101 is burned up, the welding power supply device 105 stops the constant output at a timing TE4'.

This "burn-back" control method is a widely used control method for preventing occurrence of a so called wire stick phenomenon in which the welding wire 101 is contacted with a molten pool (not shown) and is thereby fixed when the welding is ended.

Patent literature: JP 2002-205169 publication

However, the conventional consumable electrode type welding method requires the reversing operation of the robot manipulator 109.

That is, when it is detected that the leading end of the welding wire 101 is contacted with the base metal 107, the reduction of the speed of the robot manipulator 109 moving forwardly is started, the forward movement of the robot manipulator 109 is the caused to stop once, and, after then, the operation of the robot manipulator 109 is reversed and accelerated in the backward direction, which requires not only the response time of the robot manipulator 109 but also the acceleration and reduction times thereof.

Also, since the wire feed motor 103 is actuated for the first time after generation of the initial arc, the feed of the welding wire 101 is not be able to catch up with the melting speed of the welding wire 101 to thereby extend the length of the arc 108, resulting in the unstable arc 108.

And, in the welding end time, to prevent the "wire stick" phenomenon, there is necessary the "burn-back" processing, which takes time for execution of this processing, so that the tact time is extended. Also, there is formed a ball-like fixed body in the leading end of the welding wire 101 due to the burnt-up of the welding wire 10, which obstructs the arc start in the next step.

Thus, it is an object of the invention to provide a consumable electrode type welding method which can reduce the waste time found in the conventional consumable electrode type welding method, can hold the proper length of an arc after generation of the arc to thereby stabilize the arc in the welding start part, and can positively prevent the occurrence of the wire stick phenomenon and can hold the wire leading end portion in a proper shape, thereby being able to carry out a proper arc start in the next step.

BRIEF SUMMARY OF THE INVENTION

In attaining the above object, according to the invention, there is provided a consumable electrode type welding method in which, using a welding system comprising wire feed means for feeding a welding wire to a welding torch, an actuator for holding the welding torch and moving the welding torch, a control unit for driving and controlling the actuator, and a welding power supply device for applying a welding output into and between a member to be welded and the welding wire, the welding torch is moved by the actuator in a direction where the welding torch is pulled apart from the member to be welded while feeding the welding wire to thereby control the speed of the welding wire with respect to the member to be welded.

According to this method, since the actuator can control the speed of the welding wire with respect to the member to be welded through a one-way operation, the response time and acceleration/reduction time can be reduced when compared with the conventional method, and also because the distance between the welding wire and the member to be welded can be controlled with a good following capability, an arc can be stabilized early.

Also, the "burn-back" processing time in the welding end time can also be reduced when compared with the conventional method.

As described above, according to the invention, since, while feeding the welding wire, the actuator moves the welding torch in a direction where the welding torch is pulled apart from the welding wire to thereby allow an initial arc to occur with the welding wire separated from the member to be welded, not only the reversing operation is eliminated and thus the waste time is reduced to be thereby able to reduce the tact time, but also the arc in the welding start time can be stabilized to thereby reduce the "unexpected stop" effectively.

BRIEF DESCRIPTION OF THE DRAWINGS

FIG. 5 is a schematic block diagram of a welding system used in a prior art technology.

FIG. 6 is a timing chart for an arc start time in a prior art technology.

FIG. 7 is a timing chart for an arc end time in a prior art technology.

DETAILED DESCRIPTION OF THE INVENTION

Embodiment

Now, description will be given below of an embodiment of a consumable electrode type welding method according to the invention with reference to FIGS. 1 to 4.

Figure 1:
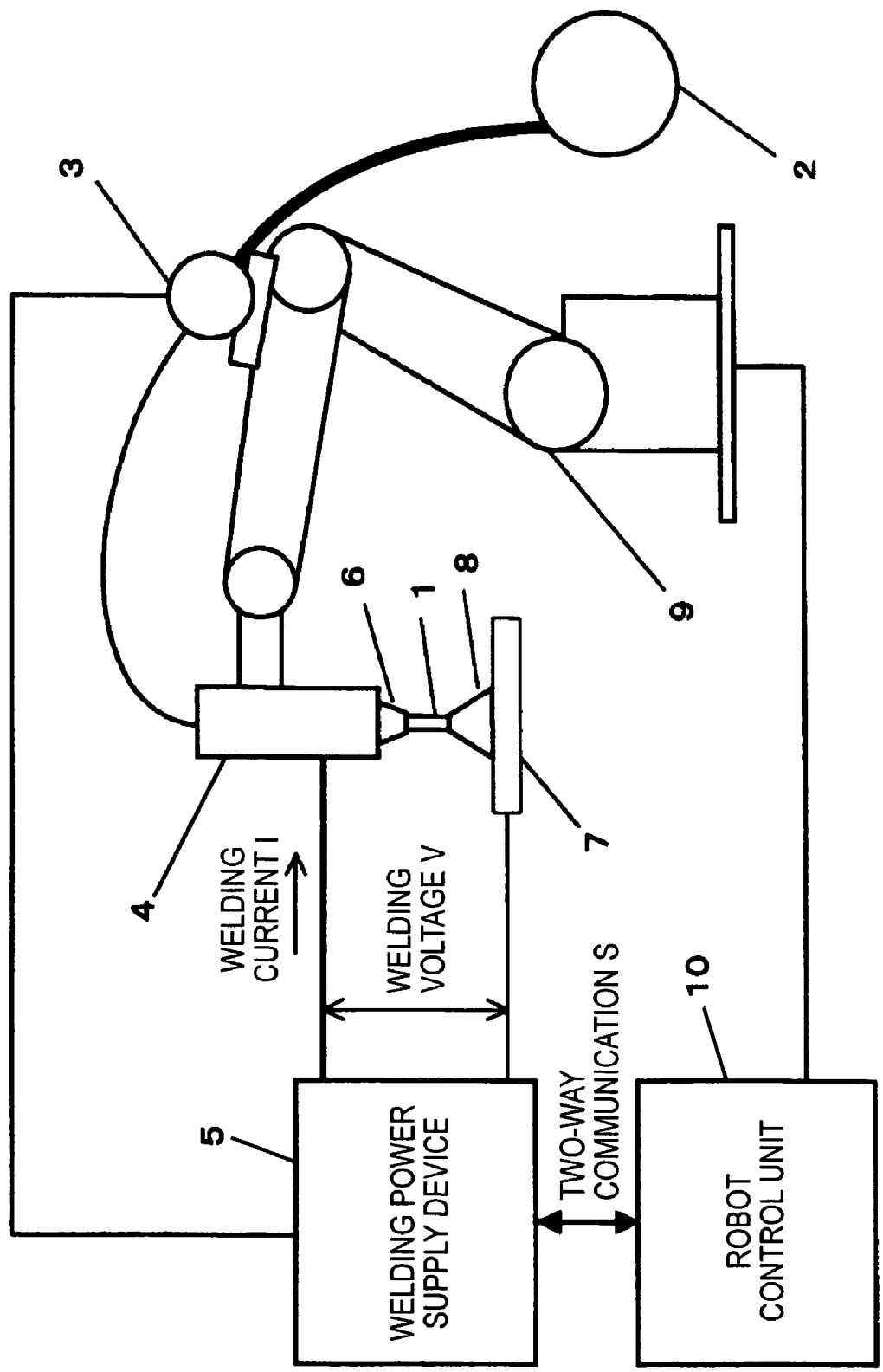
FIG. 1 is a schematic block diagram of a welding system for use in an embodiment according to the invention.

FIG. 1 is a schematic block diagram of the outline of a welding system for enforcing the invention, in which reference character 1 designates a welding wire used as a consumable electrode to be played out in the direction of a welding torch 4 from a wire spool 2 by a wire feed motor 3.

5 stands for a welding power supply device which applies a given welding current I and a given welding voltage V, through the welding torch 4 and a welding tip 6, into between the welding wire 1 and a base metal 7 used as a member to be welded to generate an arc and also controls the wire feed motor 3, thereby enforcing the welding operation.

9 designates a robot manipulator which holds the welding torch 4, positions the welding torch 4 at a welding start position (not shown), and moves the welding torch 4 along a welding line (not shown).

Also, the robot manipulator 9 is controlled by a robot control unit 10. The robot control unit 10 executes a two-way communication S between the welding power supply device 5 and itself and transmits welding conditions such as the welding current I and welding voltage V as well as welding start and end instructions.

Figure 2:
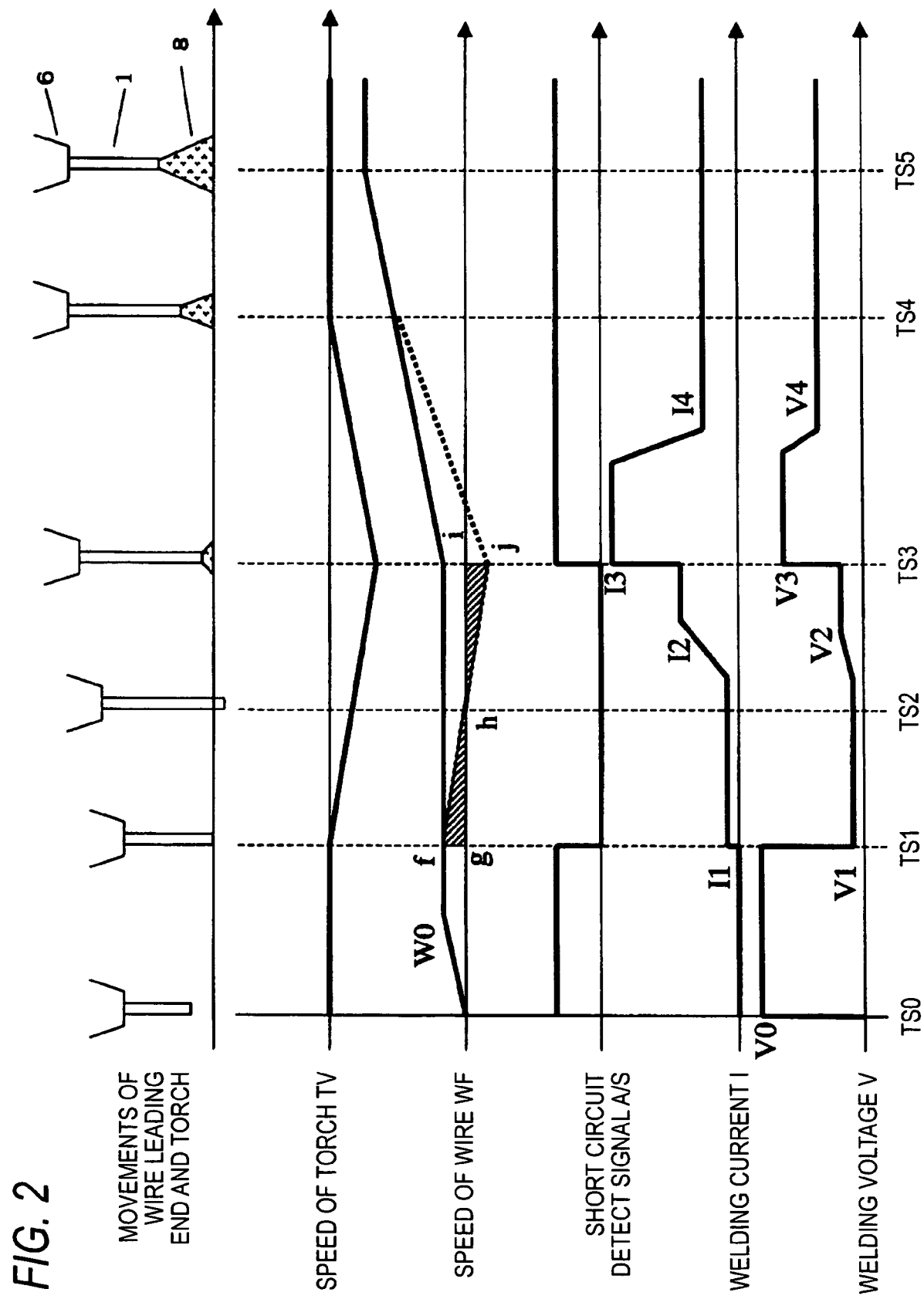
FIG. 2 is a timing chart for an arc start time in an embodiment according to the invention.

Referring to FIG. 2, in the vertical direction thereof, there are shown the respective states of the moving speed of the welding torch TV, the feed speed of the welding wire WF, short circuit detect signal A/S, welding current I and welding voltage, whereas, in the horizontal axis thereof, there is shown time. As timings, TS0 designates a timing where a welding start signal is transmitted from the robot control unit 10 to the welding power supply device 5, while TS1-TS5 respectively express timings following TS0.

In FIG. 2, according to the present embodiment, when the welding start signal is transmitted from the robot control unit 10 to the welding power supply device 5 (TS0), the welding power supply device 5 applies a no-load voltage V0 into between the welding wire 1 and base metal 7 and also actuates the wire feed motor 3 to thereby accelerate the welding wire 1 toward the base metal 7.

When the feed speed of the welding wire 1 reaches an initial wire speed W0, the welding power supply device 5 causes the wire feed motor 3 to stop the acceleration of the welding wire but continues the wire feed at a constant speed.

Then, at the timing TS1, when the welding wire 1 is contacted with the base metal 7, a short circuit signal A/S is output from short circuit detect means (not shown) which is provided in the inside of the welding power supply device 5.

The short circuit detect signal A/S is transmitted through the two-way communication S to the robot control unit 10. The robot control unit 10 immediately actuates the robot manipulator 9 to start to move the welding torch 4 in a direction where the welding torch 4 is pulled substantially apart from the base metal 7 and also to lift the welding torch 4.

A period from TS1 to TS3 is a short circuit period and, during this period, the welding wire 1 is continuously fed at an initial wire speed W0 and the robot manipulator 9 continues to lift the welding torch 4. Therefore, the speed of the leading end portion of the welding wire 1 is a composite speed of the wire speed WF and torch speed TV as shown by a broken line in FIG. 2.

Thus, the leading end of the welding wire 1, at and after TS1, causes the welding wire 1 to be pressed against the base metal until TS2 where the composite speed shown by a broken line in FIG. 2 becomes zero; at and after TS2, the composite speed turns to a negative speed and thus the pressing amount decreases; and, at the timing TS3, the short circuit is opened. The timing TS3 occurs at the time when the wire lifting amount, that is, the area of a triangle hji exceeds the wire pressing amount or the area of a triangle fgh.

By the way, when an initial short circuit occurs at the timing TS1, the welding power supply device 5 controls the welding current I to turn to I1 and, after passage of a given time, increases the current up to I2 and waits for the opening of the short circuit.

The reason why the welding current is controlled to I1 set relatively low as the first stage of the initial short circuit period is to prevent occurrence of a phenomenon that the wire can be molten due to the Joule heat of the wire leading end portion caused by the initial short circuit and thus the molten wire can spatter around simultaneously with generation of an arc.

Also, the reason why the welding current is varied from I1 to I2 is to be able to provide sufficient energy to generate an arc when the short circuit is opened at the timing TS3.

Figure 3:
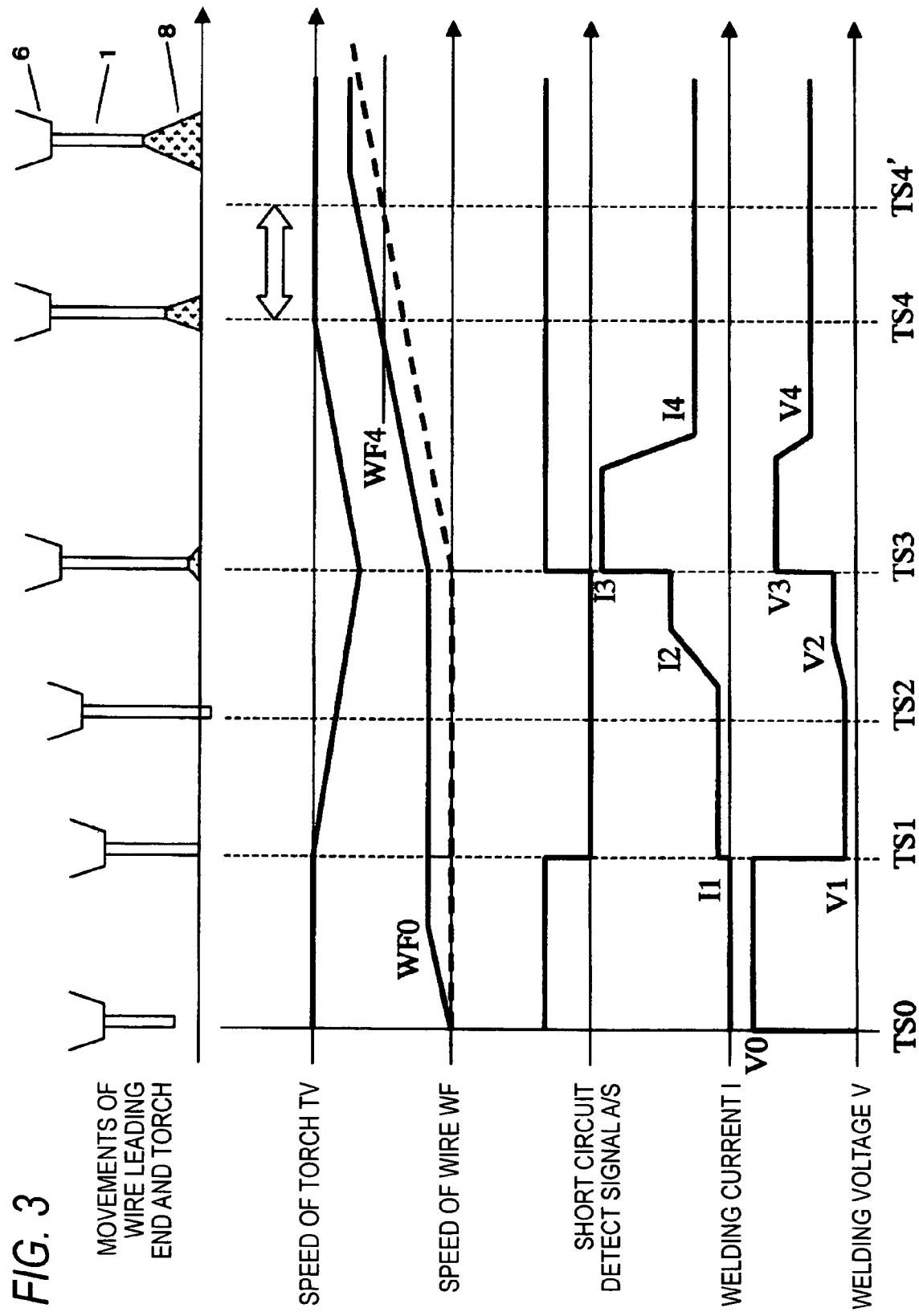
FIG. 3 is a timing chart for an arc start time used to compare the embodiment according to the invention with a prior art technology.

Now, FIG. 3 is an explanatory timing chart in which the wire speed WF according to the prior art shown by a broken line is overlapped on the same timing chart as shown in FIG. 2 according to the present embodiment, in order to be able to compare the invention with the prior art.

As can be seen clearly from FIG. 3, in the arc start according to the prior art, at the time when the short circuit is opened and an arc is generated at the timing TS3, the welding wire starts to accelerate for the first time. Therefore, for example, if the timings of the invention and prior art when the wire speed becomes WF4 are compared with each other, the prior art method is found slower by the time from TS4 to TS4'.

As described above, according to the present embodiment, when it is detected that the leading end of the welding wire 1 comes into contact with the base metal 7 used as the member to be welded, by lifting the welding torch 4 using the robot manipulator 9 while continuing the forward feed of the welding wire 1, an arc is generated in a state where the welding wire 1 is separated from the base metal 7. Owing to this, not only the reverse operation of the robot manipulator is eliminated to thereby be able to reduce the waste time and thus the tact time but also an arc in the welding start end portion can be stabilized and thus the "unexpected stop" can be reduced effectively.

Next, description will be given below of an embodiment of an arc end according to the invention with reference to a timing chart shown in FIG. 4.

Figure 4:
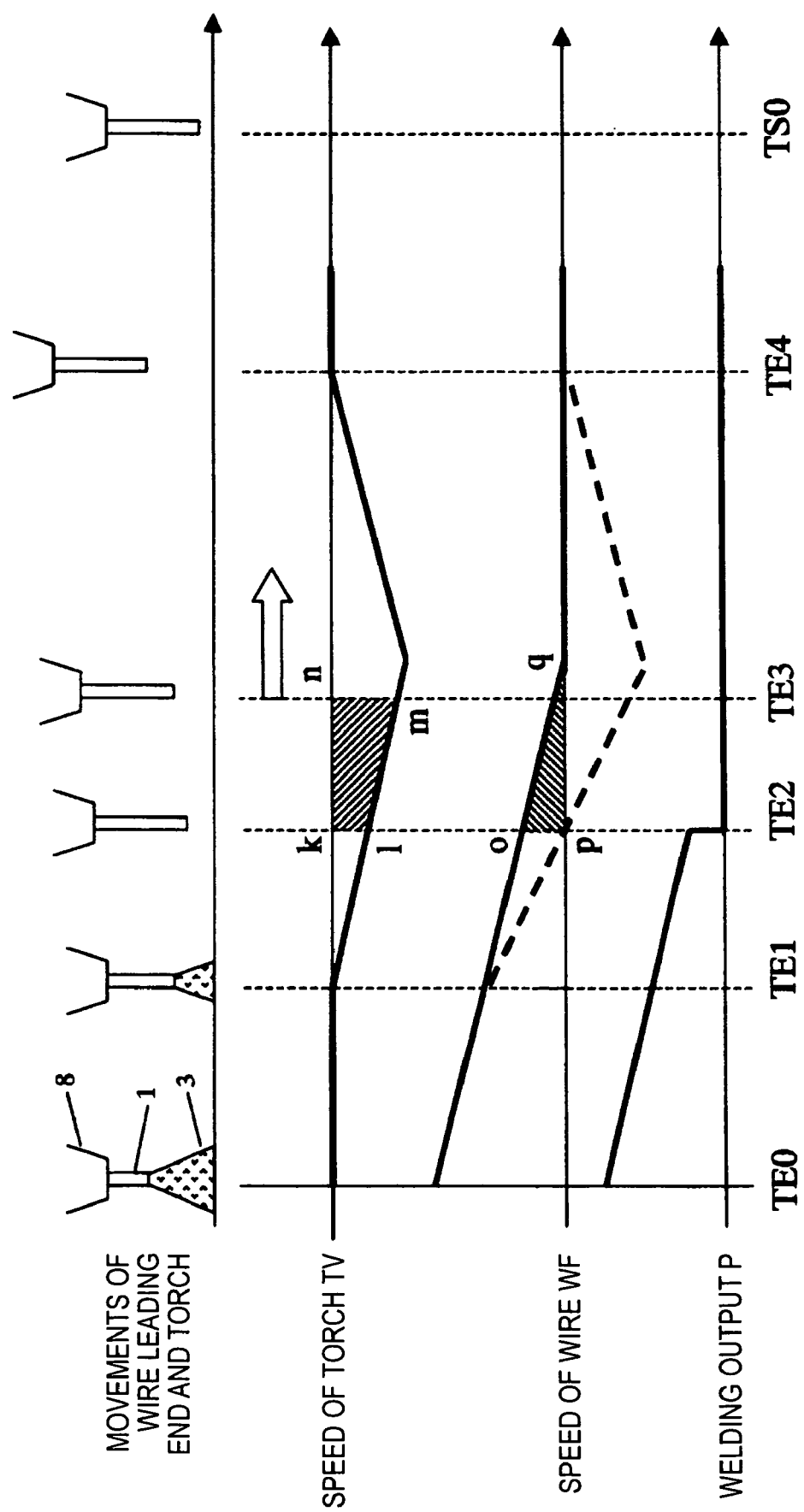
FIG. 4 is a timing chart for an arc end time in an embodiment according to the invention.

By the way, in FIG. 4, in the vertical direction thereof, there are shown the respective states of the moving speed of the welding torch TV, the feed speed of the welding wire WF and welding output P and, in the horizontal axis thereof, there is expressed time; and, as timings, the time when a welding end signal is transmitted from the robot control unit 10 to the welding power supply device 5 is expressed as a timing TE0, while TE1-TE4 respectively express timings following the timing TE0.

According to the present embodiment, on receiving the welding end signal from the robot control unit 10, the welding power supply device 5 controls the wire feed motor 3 to reduce the speed of the welding wire.

In linking with the speed reduction of the welding wire, the welding output is also reduced and, at the timing TE1 where a predetermined condition is satisfied, the welding power supply device 5 transmits a start signal for lifting the welding torch 4 to the robot control unit 10.

On receiving the lifting operation start signal from the welding power supply device 5, the robot control unit 10 immediately controls the robot manipulator 9 to lift the welding torch 4.

As a result, the speed of the leading end of the welding wire 1 becomes a composite speed of the wire speed WF and torch speed TV, that is, it becomes such speed as shown by a broken line in FIG. 4.

Thus, at the timing TE2, the speed of the welding wire 1 becomes zero with respect to the base metal 7, thereby being able to stop the welding output P.

From that time on as well, the operation of the welding wire 1 and the lifting operation of the welding torch 4 are executed continuously but, at the time when the area of a trapezoid klmn, which corresponds to the lifting distance of the welding torch 4, exceeds the area of a triangle opq corresponding to the inertial running distance of the welding wire 1 until it stops, there is eliminated a danger of the wire stick phenomenon in which the welding wire 1 is contacted with the molten pool of the base metal 7 and is thereby fixed. Therefore, the robot control unit 10 immediately controls the robot manipulator 9 so as to be able to switch over to a next operation (for example, an operation in which the manipulator 9 moves to the position of the welding torch at the welding start time for a next welding operation).

As described above, according to the present embodiment, since there is eliminated the time conventionally necessary for the "burn-back" operation, the tact time can be reduced quite effectively; and also, since there is prevented formation of a large ball-like fixed body in the leading end of the welding wire 1 due to the burn-up of the welding wire, there can be avoided an ill influence on the welding start for the next step.

By the way, in the present embodiment, the lifting operation of the welding torch is carried out by the robot manipulator. However, there may also be provided an actuator separately and the lifting operation of the welding torch may be executed using this 5 actuator. And, in this case, without using a robot, for example, using an automatic machine, the welding torch may be positioned or may be moved along a welding line, which, of course, has no ill influence on the effects of the invention.

A consumable electrode type welding method according to the invention not only can eliminate the need for the reverse operation of the robot manipulator to reduce the waste time to thereby be able to reduce the tact time but also can stabilize an arc in the welding start portion and reduce the "unexpected stop" effectively. Therefore, the invention is industrially useful as a consumable electrode type welding method which is used, for example, in production facilities and construction work.

The invention claimed is:

1. A consumable electrode type welding method in which, using a welding system comprising wire feed means for feeding a welding wire to a welding torch, an actuator for holding and moving the welding torch, a control unit for driving and controlling the actuator, and a welding power supply device for applying a welding output into between a member to be welded and the welding wire, the method comprising the steps of:
   moving the welding torch by the actuator in a direction parting away from the member to be welded while feeding the welding wire; and
   controlling the speed of the welding wire with respect to the member to be welded.

2. A consumable electrode type welding method as set forth in claim 1, wherein, at a welding start time, firstly, the welding wire is fed while the actuator is stopped and, after the welding wire is contacted with the member to be welded, while applying a welding output, the welding torch is pulled apart from the member to be welded at a speed equal to or higher than the feed speed of the welding wire by the actuator.

3. A consumable electrode type welding method as set forth in claim 2, wherein, at a welding start time, firstly, while the actuator is stopped, the speed for feeding the welding wire is set equal to or lower than the feed speed of the welding wire in a normal welding time and, after the welding torch is pulled apart from the member to be welded, the feed speed of the welding wire is changed to the feed speed of the welding wire in the above normal welding time.

4. A consumable electrode type welding method as set forth in claim 2, wherein, after contact of the welding wire with the member to be welded, while applying the welding output, the welding torch is pulled apart from the member to be welded to a given distance at the speed equal to or higher than the feed speed of the welding wire by the actuator and, after then, the movement of the welding torch in the pull-apart direction is caused to stop.

5. A consumable electrode type welding method as set forth in claim 1, wherein, in a welding end time, while reducing the feed speed of the welding wire as well as the welding output, the welding torch is pulled apart from the member to be welded at a speed equal to or higher than the feed speed of the welding wire by the actuator and, at a timing where the feed speed of the welding wire balances substantially with the moving speed of the actuator, the welding output is caused to stop.

6. A consumable electrode type welding method as set forth in claim 5, wherein, at least until the feed speed of the welding wire reaches zero, the welding torch is moved by the actuator in a direction where it is pulled apart from the member to be welded.

7. A consumable electrode type welding method as set forth in claim 5, wherein, until the leading end position of the welding wire reaches a distance between the welding wire leading end and the member to be welded in the welding start time, the welding torch is pulled apart from the member to be welded by the actuator.

8. A consumable electrode type welding method as set forth in claim 1, further comprising feeding the welding wire while the actuator is stopped.

* * * * *